Nov. 4, 1969 T. D. LODE 3,476,448

MAGNETIC BEARING

Filed Aug. 30, 1965

INVENTOR
TENNY D. LODE

United States Patent Office 3,476,448
Patented Nov. 4, 1969

3,476,448
MAGNETIC BEARING
Tenny D. Lode, Madison, Wis., assignor to Rosemount Engineering Company, Minneapolis, Minn., a corporation of Minnesota
Filed Aug. 30, 1965, Ser. No. 483,726
Int. Cl. F16c 39/06
U.S. Cl. 308—10          9 Claims

ABSTRACT OF THE DISCLOSURE

A non-contacting support for a mechanical element such as a shaft. Support is provided from zones of magnetic field components along a length of support surface, where adjacent zones are of opposite magnetic polarity, and resulting repulsion forces between the supporting surface and a supported surface. Spacing between zones of opposite magnetic polarity is of same order as spacing from the supported surface to provide relatively high change of force with distance. Alternating electromagnetic fields are used to induce surface currents in a supported member of conducting material in one embodiment and a superconducting supported element is used with a permanently magnetized ferromagnetic support structure in a second embodiment.

---

Figure 1:
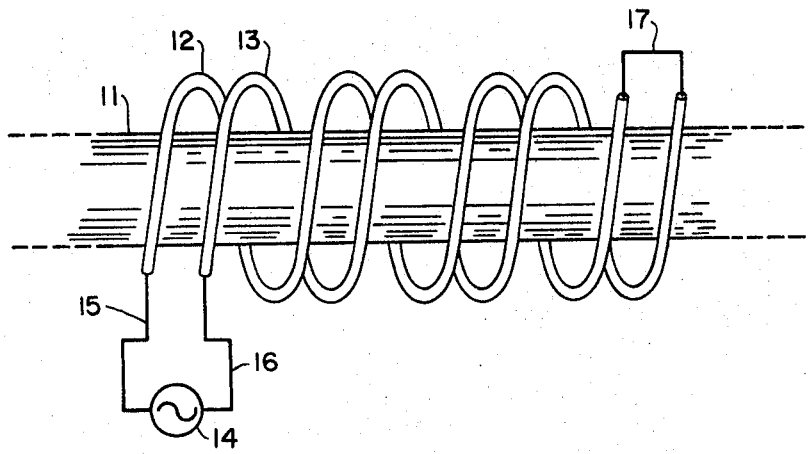

This invention relates to bearings for the support and constraint of mechanical elements which may rotate or otherwise move with respect to surrounding or adjacent mechanical elements. More particularly, it relates to bearings which provide such support through electromagnetic forces and without requiring direct mechanical contact or a lubricant in contact with supported elements.

Mechanical bearings of one sort or another are required in almost all machines. As is well known, many different types of bearings have been devised to meet the requirements of various machines and applications.

One disadvantage of most known bearings for certain types of scientific instruments and other devices is the friction and drag which must be overcome in order to turn or move the supported element. An object of this invention is to provide a method and means for the support of mechanical elements which will be relatively free of friction, drag and other undesired forces.

It is usually desirable to operate at least part of the equipment on board a space vehicle or satellite in the relative vacuum of space. Many types of conventional bearings depend directly or indirectly upon the use of a lubricant for proper operation. Since most conventional lubricants will evaporate or sublime in the vacuum of space, bearings which require lubrication may not be satisfactory for space applications. An object of this invention is to provide a method and means for the support of mechanical elements which does not require the presence of a lubricant.

Mechanical wear may be a problem in machines which operate at high speeds and/or which are expected to have a relatively long useful life. A major cause of wear is direct or indirect mechanical contact between a bearing and a supported structure. An object of this invention is to provide a method and means for supporting a rotating or movable element which does not require direct or indirect mechanical contact with the supporting bearing.

Other objects and advantages may be seen by reference to the following specification and to the drawings.

In a particular form of the present invention, a pair of conductors are wound in a helix pattern around a conducting metal shaft which is to be supported. The spacing between the two individual conductors and the spacing between each conductor and the supported shaft are of approximately the same magnitude. Both spacings remain substantially constant over the entire winding. An alternating electric current is passed through the two helix conductors such that the instantaneous current will pass in one direction through one conductor and in the opposite direction through the other conductor. As will be described subsequently in this specification, the alternating electromagnetic fields due to these currents will tend to support the shaft at the center of the helix. This form of the invention is illustrated in FIGURE 1 and will be described subsequently in greater detail.

In the drawings:
FIGURE 1 is a pictorial and schematic illustration of a first form of the invention showing the support of a conducting shaft with two current-carrying conductors; and
FIGURE 2 is a pictorial and section view of a second form of the invention showing the support of a conducting shaft with ferromagnetic support elements.

Figure 2:
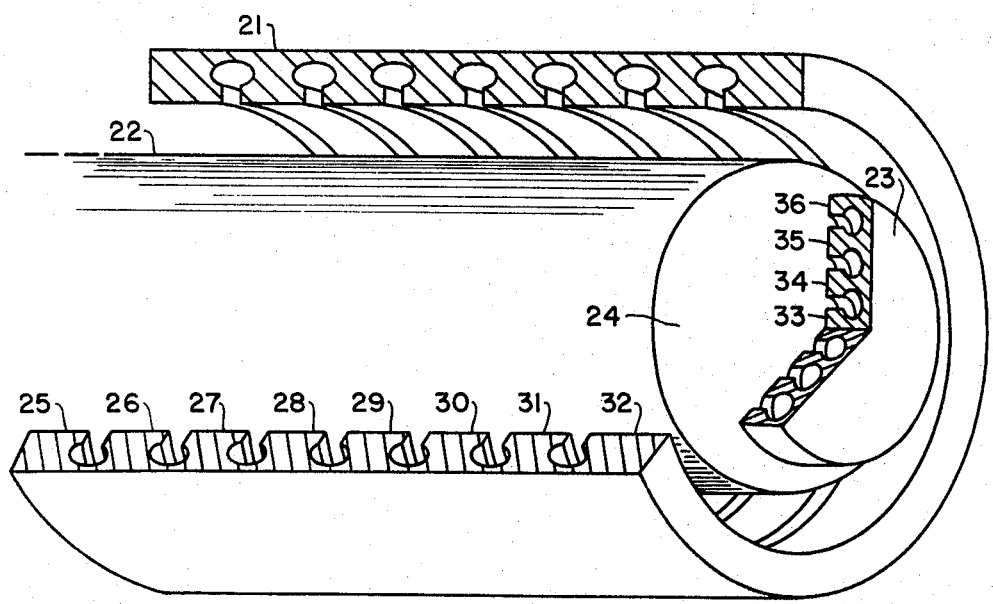

Referring now to the drawings, FIGURE 1 includes conducting metal shaft 11 which passes through helix conductors 12 and 13. A first side of alternating current source 14 connects via line 15 to a first end of conductor 12. The second side of source 14 connects via line 16 to a first end of conductor 13. The second ends of conductors 12 and 13 are joined by line 17. Conductors 12 and 13 are assumed to be mechanically supported with respect to other structures which are not specifically shown. The object of the structure of FIGURE 1 is to support shaft 11 with respect to conductors 12 and 13 and hence with respect to other portions of a machine.

It is well known that an alternating electromagnetic field will induce currents in a conducting object which will tend to cause a mutual repulsion between that object and the source of the alternating electromagnetic field. However, such repulsive forces are not necessarily sufficient to support an object in a stable position or to allow the design and construction of a satisfactory magnetic bearing. For example, the atmosphere presses with a force of approximately 15 pounds per square inch on all exposed sides of an object on the surface of the earth. However, because this atmospheric pressure is substantially constant on all exposed sides, and does not vary significantly with small motions of an object, it does not generate a restoring force to return an object to a particular position. A conducting metal shaft may be surrounded by a helical conductor carrying an alternating current. The alternating electromagnetic field due to this current will exert a repulsive force or magnetic pressure on the metal shaft due to currents induced within the shaft. However, this does not necessarily mean that it will provide a significant centering force to return the shaft to a particular stable position. In order to provide such stable centering forces it is necessary that the magnetic repulsive force vary significantly with distance or position.

In the circuit of FIGURE 1, alternating current flows in a circular loop from source 14 through line 15, conductor 12, line 17, conductor 13 and line 16 back to source 14. The currents flowing through conductors 12 and 13 will generate corresponding alternating electromagnetic fields in the region between these conductors and shaft 11. In FIGURE 1, the spacing between conductors 12 and 13 is of the same order of magnitude as the spacing between either of those conductors and the surface of shaft 11 when shaft 11 is in the desired position. As described previously, the alternating electromagnetic field generated by currents through conductors 12 and 13 will establish mutually repulsive magnetic forces between conductors 12 and 13 and shaft 11. With the spacings shown, the fields due to currents through conductors 12 and 13 wil partially cancel at the surface of shaft 11 as these currents flow in opposite directions. If shaft 11 should move slightly in one direction, it will be closer to one side of the helix winding and further away from the other. On the side where shaft 11 is further away from helix conductors 12 and 13, the alternating electromagnetic fields will cancel to a greater extent and the magnetic repulsion will be reduced. On the side where shaft 11 is closer to helix conductors 12 and 13, the alternating electromagnetic fields will cancel less and the electromagnetic repulsion will be increased. Hence, a centering force will be generated to return shaft 11 to a stable center position.

For convenience, FIGURE 1 has shown a relatively short electromagnetic bearing device wound around shaft 11. Such a bearing device may be made as long as desired to support and/or position a shaft. Several such bearing devices may be used to support a shaft at one or both of its end and/or various intermediate points. The bearing structure of FIGURE 1 allows longitudinal as well as rotational motion of shaft 11. If desired, one or more current-carrying conductor assemblies may be placed adjacent to one or both ends of shaft 11 so as to provide longitudinal centering or positioning. One form of longitudinal constraint is shown in FIGURE 2 and will be described below.

Reference is now made to FIGURE 2 which illustrates a second form of the invention employing a ferromagnetic structure for the support of a conducting shaft. In FIGURE 2, stator 21 surrounds conducting cylindrical shaft 22. Stator 23 is adjacent to end face 24 of shaft 22. Stators 21 and 23 are shown partially cut away so as to illustrate their cross sections. Stator 21 has seven circular slots cut into its inside surface. These slots divide the inside surface into eight distinct magnetic pole faces, 25, 26, 27, 28, 29, 30, 31 and 32. Stator 23 similarly has three concentric circular slots cut into its face, adjacent to face 24. These slots divide that face of stator 23 into four distinct magnetic poles, 33, 34, 35 and 36. At least the outer portion of shaft 22 is assumed to be of a material in a superconducting state.

At the present time, superconductors are generally formed by placing certain metal or alloys in a superconductive state by cooling to temperatures of a few degrees Kelvin. Stators 21 and 23 are supported by other machine elements which are not specifically shown in FIGURE 2. The object of the structure of FIGURE 2 is to support and position shaft 22 with respect to stators 21 and 23 and, hence, with respect to other machine elements.

It is known that a steady state unidirectional magnetic field of moderate magnitude will not penetrate into the interior of a superconductor. The rejection of a magnetic field by a superconductor will tend to cause a mutual repulsive force between the superconductor and the source of the magnetic field. This is similar to the mutual repulsion described for ordinary conductors and alternating magnetic fields in connection with FIGURE 1. Stator 21 is of a material which may be permanently magnetized. It is assumed to have been permanently magnetized so that pole faces 25, 27, 29 and 31 are of one magnetic polarity while pole faces 26, 28, 30 and 32 are of an opposite magnetic polarity. As described in connection with FIGURE 1, the magnetic fields due to stator 21 will decrease rapidly with distance away from the pole faces because of increasing cancellation between the fields due to individual poles. Hence, the repulsive force between shaft 22 and stator 21 will also decrease rapidly with increasing distance from the surface of stator 21. The result will be that the repulsive magnetic forces will tend to maintain shaft 22 in a center position with respect to stator 21. Stator 23 similarly repels end face 24 of shaft 22 with a force which decreases significantly with increasing distance between end face 24 and stator 23. This alone will not center shaft 22 along a longitudinal axis. However, it is assumed that the structure of FIGURE 2 is a bearing assembly on one end of shaft 22 and that a similiar bearing assembly is provided on the opposite end of shaft 22. The combined effect of stator 23 and a similar end stator on the opposite end of shaft 22 will then provide longitudinal centering of shaft 22 due to the repulsive forces which decrease with distance.

FIGURE 1 has shown the support of a shaft by an alternating current carrying helix conductor assembly wound around the shaft to be supported. FIGURE 2 has shown the support of a shaft by two distinct permanently magnetized stators. In some instances, it may be desirable to combine these techniques. For example, current-carrying coils may be placed in the slots of a stator or otherwise so as to magnetically excite one or more stators. Depending on the application, such current-carrying coils may be excited with alternating and/or unidirectional current as desired.

FIGURE 2 has shown the support and positioning of a round, cylindrical shaft by two stator assemblies. If desired, objects of other shapes may be supported and/or positioned by one, two or a greater number of stators whose individual shapes are appropriately designed for the faces of the object to which they will be adjacent. Such supports may allow rotational motion, translational motion, a combination of these motions or none of these motions. The slots and/or poles in such constraint plates may be circular as shown in FIGURE 2, rectangular, straight, or of other configuration as desired or as appropriate for the particular application.

One or more of the current-carrying conductors and/or the supported shaft or other object in a structure such as that of FIGURE 1 may be of material in a superconductive state. The current-carrying conductors may be excited with unidirectional current either in addition to or in place of alternating current excitation.

What is claimed is:

1. A magnetic bearing for the support of an electrically conducting mechanical element including a bearing stator, means for generating a plurality of zones of magnetic field components along a surface of said stator, adjacent zones being of opposite magnetic polarity and being spaced with respect to said element such that said magnetic field components will tend to oppose and cancel each other at said element to an extent which increases substantially with a small increase in distance of said element from said stator.

2. The combination as specified in claim 1 in which said magnetic field generating means comprises a pair of alternating current-carrying wires having current flow in opposite directions in adjacent wires and wherein the spacing between wires is substantially equal to the spacing between said wires and said element.

3. The combination as specified in claim 1 in which said conducting mechanical element is superconducting and said means for generating a plurality of zones of magnetic field components includes a ferromagnetic stator element with a plurality of spaced magnetic pole faces and means maintaining said pole faces in a magnetized state.

4. A magnetic bearing for the support of a mechanical element, at least a portion of which is superconducting, including a bearing stator, a plurality of distinct magnetic pole faces upon said stator, and means including material which is magnetically retentive and permanently magnetized for establishing and maintaining a state of magnetization of said stator such that adjacent pole faces thereof are magnetized in opposite polarities.

5. A magnetic bearing for the support of an electrically conducting shaft including a pair of adjacent conductors wound together in a helix pattern around said shaft, the spacing between said adjacent conductors being substantially of the same order of magnitude as the spacing between said conductors and said shaft, a source of alternating electric current, and means connecting said source to said conductors such that the flow of electric current is in opposite directions through said conductors.

6. A magnetic bearing for the support of a shaft in which at least a part of said shaft is of a material in a superconducting state including a pair of adjacent conductors wound together in a helix pattern around said shaft, the spacing between said adjacent conductors being substantially of the same order of magnitude as the spacing between said conductors and said shaft, a source of unidirectional electric current, and means connecting said source to said conductors such that the flow of electric current is in opposite directions through said conductors.

7. A magnetic bearing support assembly comprising first and second spaced mechanical elements positioned for relative support, magnetic field means providing a plurality of zones of magnetic field components closely spaced along a surface of said first element wherein adjacent ones of said zones are of opposite magnetic polarity and the spacing between said zones is substantially uniform, said second element having a conducting surface in confronting relation to said first element surface, said second element surface being spaced at a distance from said zones of magnetic field components which is substantially the same as said spacing between said zones so that the magnetic field components from adjacent zones strongly oppose each other at said element and small changes in spacing result in large changes in support.

8. The bearing support of claim 7 wherein said conducting surface is superconducting.

9. The bearing support of claim 7 wherein said magnetic field means includes conducting elements at said zones, and means providing alternating current through said conducting elements so that alternating magnetic fields extend to said conducting surface and exert a repulsive force between said first and second elements due to reaction with alternating currents induced within said second element.

References Cited

UNITED STATES PATENTS

| | | | |
|---|---|---|---|
| 3,005,117 | 10/1961 | Buchhold | 310—52 |
| 3,026,151 | 3/1962 | Buchhold | 308—10 |
| 3,112,962 | 12/1963 | Lautzenhiser | 308—10 |
| 3,175,405 | 3/1965 | Doyle et al. | 308—10 |

MILTON O. HIRSHFIELD, Primary Examiner

L. L. SMITH, Assistant Examiner

U.S. Cl. X.R.

310—10